United States Patent [19]
Narita et al.

[11] Patent Number: 5,523,862
[45] Date of Patent: Jun. 4, 1996

[54] PARABOLIC DIELECTRIC MULTILAYER REFLECTOR

[75] Inventors: Mitsuo Narita; Yoshio Okazaki, both of Himeji; Toshiya Ukai, Kakogawa, all of Japan

[73] Assignee: Ushiodenki Kabushiki Kaisha, Tokyo, Japan

[21] Appl. No.: 233,282

[22] Filed: Apr. 25, 1994

[30] Foreign Application Priority Data

Apr. 23, 1993 [JP] Japan .................................. 5-119296

[51] Int. Cl.$^6$ .............................. G02B 5/25; G02F 1/335
[52] U.S. Cl. .............................. 359/49; 359/71; 359/584; 359/589; 313/112
[58] Field of Search .................. 359/48, 49, 70, 359/71, 359, 584, 589; 313/112, 113

[56] References Cited

U.S. PATENT DOCUMENTS

| | | |
|---|---|---|
| 4,861,142 | 8/1989 | Tanaka et al. |
| 5,143,445 | 9/1992 | Bateman et al. .................. 313/112 |
| 5,339,198 | 8/1994 | Wheatley et al. ................. 359/584 |

FOREIGN PATENT DOCUMENTS

| | | | |
|---|---|---|---|
| 372438 | 12/1989 | European Pat. Off. ............... | 359/584 |
| 58-217901 | 12/1983 | Japan ..................................... | 359/584 |
| 1-35502 | 2/1989 | Japan ..................................... | 359/584 |
| 2202963 | 10/1988 | United Kingdom ................... | 359/584 |

OTHER PUBLICATIONS

"Principles and Properties of Cold Mirrors," ISOMET Corporation, Technical Memorandum No. 1, Jan. 1965.

*Primary Examiner*—Martin Lerner
*Attorney, Agent, or Firm*—Keck, Mahin & Cate

[57] ABSTRACT

A reflector used for a light source material of a liquid crystal video projector provides a good projection image and causes no color shading to occur in the periphery of a screen. The reflector has a surface on which a dielectric multifilm coating is deposited. The reflector reflects only visible light beams and has a wavelength $\lambda_1$, which has a spectral transmittance on a short wave side (with normal incidence) of 20% and is equal to or smaller than 440 nm and, at the same time, has a wavelength $\lambda_2$, which has a spectral transmittance on a long wave side (with normal incidence) of 50% and is equal to or greater than 820 nm.

4 Claims, 4 Drawing Sheets

PARABOLIC DIELECTRIC MULTILAYER REFLECTOR

BACKGROUND OF THE INVENTION

1. Field of the Invention

The invention relates to a reflector used for a light source material of a liquid crystal video projector.

2. Description of Related Art

A reflector, which is used for a light source material of a liquid crystal video projector, reflects with high efficiency radiation light e.g. produced by a short arc-type metal halide lamp, converts it into parallel light beams and conducts it to a liquid crystal panel.

In the case of a colour projection by means of a reflector reflected, parallel light beams are dispersed through a dichroic mirror in red, blue and green and in each case introduced into a liquid crystal panel. An image formed on the liquid crystal panel is supplied to a projection lens, whose passage light is projected onto a screen.

Such a reflector is made from a light-transmitting, heat-resistant glass and has a substantially parabolic internal shape, in order to obtain parallel light beams. There is a point source of light in a focus position of the reflector.

By depositing a dielectric multifilm coating on one surface of the paraboloid only visible light beams are reflected and projected in the direction of the liquid crystal panel, whereas neither infrared beams nor ultraviolet beams are projected in the direction of said liquid crystal panel, because they are not reflected by the reflector and instead pass through the same.

FIG. 1 shows an example of a graph of a spectral transmittance, in which radiation light from a light source has vertically entered a reflector on which is deposited a multifilm coating of titanium dioxide ($TiO_2$) and silicon dioxide ($SiO_2$). In the graph the abscissa axis represents a radiation wavelength from the light source and an ordinate axis the transmittance through the reflector.

This makes it clear that light with a wavelength of approximately 450 to 700 nm is reflected to a considerable extent and has a transmittance of almost 0% and that light outside this wavelength range is not reflected and passes through. If a wavelength, which on one short wave side has a spectral transmittance of 20% is designated $\lambda_1$, and a wavelength, which on one wavelength side has a spectral transmittance of 50% is designated $\lambda_2$, then $\lambda_1$ is at approximately 420 nm and $\lambda_2$ at approximately 760 nm. A reflection wavelength width ($\lambda_2-\lambda_1$) is at approximately 340 nm.

The reason why on the short wave side a wavelength with a spectral transmittance of 20% is taken as the standard and on the long wave side a wavelength with a spectral transmittance of 50% is taken as the standard, is that account is taken of the fact that the incident light is partly absorbed by the reflector and that this absorption is more pronounced in the case of light with a short wavelength than light with a long wavelength.

In order to obtain a good projection image in the case of such a liquid crystal video projector, it is necessary that one face of a screen is irradiated in a uniform manner and that there is no colour shading.

However, in practice, in the peripheries of the screen diagonal dark blue portions appear. In FIG. 5 reference numbers 100 indicate measurement points. This colour shading is illustrated by means of dots in FIG. 5. The possible reason for this is the angle of incidence of the radiation light from the light source in the reflector. This means that light beams, which are reflected with a small incidence angle in the centre of the reflector irradiate the centre of the screen, whereas light beams with a large incidence angle reflected in the reflector periphery irradiate the periphery of the screen. These incidence angle differences give rise to reflection characteristic differences between a p-polarized light and an s-polarized light of the incident light, which probably influence the colour shading.

FIG. 1 is a graph of a spectral transmittance in the case of normal incidence in the reflector (i.e. with an angle of incidence of 0°), whereas graphs of the spectral transmittance at an incidence angle of 25° and an incidence angle of 50° in the same reflector are shown in FIGS. 2 and 3 respectively.

This makes it clear that a p-polarized light and a s-polarized light in the case of an incidence angle of 0° give rise to no reflection characteristic difference. However, a reflection characteristic difference between a p-polarized light and a s-polarized light increases the larger the incidence angle and that in addition a reflection wavelength width moves towards a short wave side.

A liquid crystal display panel is structured in such a way that a liquid crystal cell including a number of picture elements is fixedly sandwiched between a p-polarizing plate and an s-polarizing plate. Light beams which pass through the centre of this liquid crystal panel are, as described hereinbefore and as a result of a small reflection characteristic difference between a p-polarized light and a s-polarized light, projected onto a screen in a state in which there is virtually no colour shading.

However, due to a large reflection characteristic difference between a p-polarized light and a s-polarized light, in the periphery of the liquid crystal panel the light beams passing through the same have a colour shading in the manner described hereinbefore. As these light beams are projected onto the screen, as a result of this said colour shading is also projected onto the screen.

SUMMARY OF THE INVENTION

The object of the invention is consequently to provide a reflector, in which in the case of use for a light source material of a liquid crystal video projector no colour shading occurs in the periphery of a screen and which has a good projection image.

According to the invention this object is achieved in that a reflector, onto whose surface is deposited a dielectric multifilm coating and which only reflects visible light beams, has a reflection characteristic, at which a wavelength $\lambda_1$, which as a spectral transmittance on a short wave side (in the case of normal incidence) of 20% is equal to or smaller than 440 nm, and a wavelength $\lambda_2$, which has a spectral transmittance on a long wave side (in the case of normal incidence) of 50% is equal to or larger than 820 nm.

This reflection characteristic was discovered as a consequence of the research of the inventors, in which by different types of changes to the deposition conditions of the multifilm coating (number of films, coating thickness, refractive index) colour shadings projected onto a screen were investigated.

The inventors namely found that as a result of the measure by which a wavelength width of the light reflected by means of the reflector, i.e. a so-called reflection wavelength width ($\lambda_2-\lambda_1$), which is equal to or greater than a given value, and by which at the same time the wavelength $\lambda_1$ and the wavelength $\lambda_2$ are determined in the above-described manner, the reflection characteristic difference between the p-polarized light and the s-polarized light has no influence in the form of colour shading on the screen.

As a result of the above-described measure, in which the reflection wavelength width is widened and at the same time its range is determined, it is possible to reduce the colour shading projected onto the screen.

In order to widen the reflection wavelength width, it is conventionally necessary to increase the number of films of the multifilm coating or the coating thickness. However, if the number of films of the multifilm coating or the coating thickness is increased, due to a reduction in the thermal stability of the multifilm coating, the desired acceptability or serviceability is not generally obtained.

However, the inventors have confirmed that e.g. when using a short arc-type metal halide lamp with a consumption capacity of 250 W as the light source, there is a reflection wavelength width of 550 nm and consequently an adequate thermal stability and that a problem-free acceptability occurs. As the light source of a liquid crystal video projector is normally constituted by a light source having an approximately identical consumption capacity, it has been confirmed that the problem of a thermal stability reduction does not occur.

BRIEF DESCRIPTION OF THE DRAWINGS

The invention is described in greater detail hereinafter relative to an embodiment and the attached drawings, wherein show.

DESCRIPTION OF THE PREFERRED EMBODIMENT

Hereinafter are given the results of tests, in which a change to the colour shading by changing the deposition conditions of the reflector was investigated.

Figure 1:
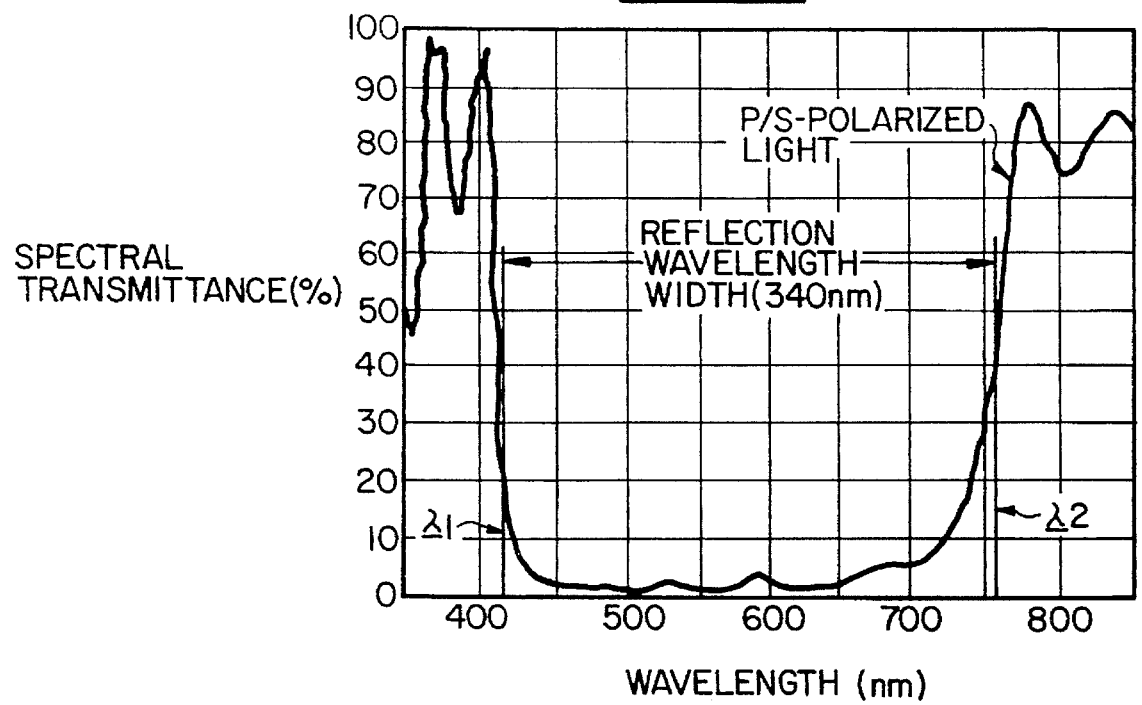
FIG. 1 A graph of spectral transmittance at normal incidence in the reflector.
Figure 2:
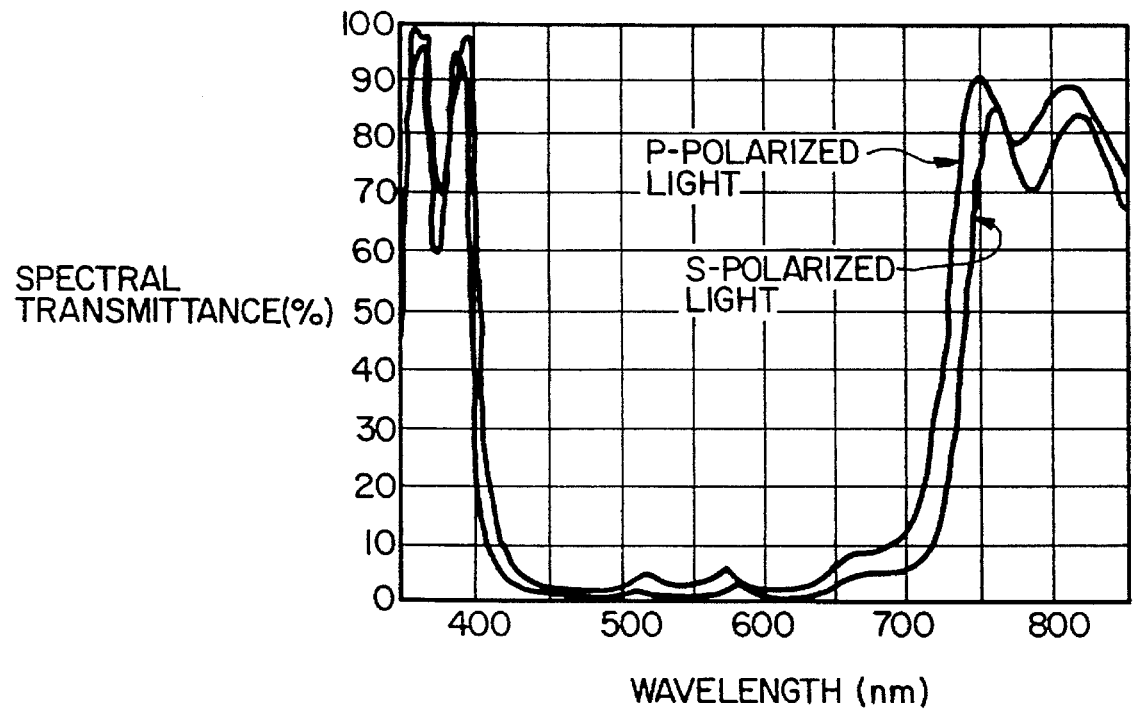
FIG. 2 A graph of spectral transmittance at an incidence angle of 25°.
Figure 3:
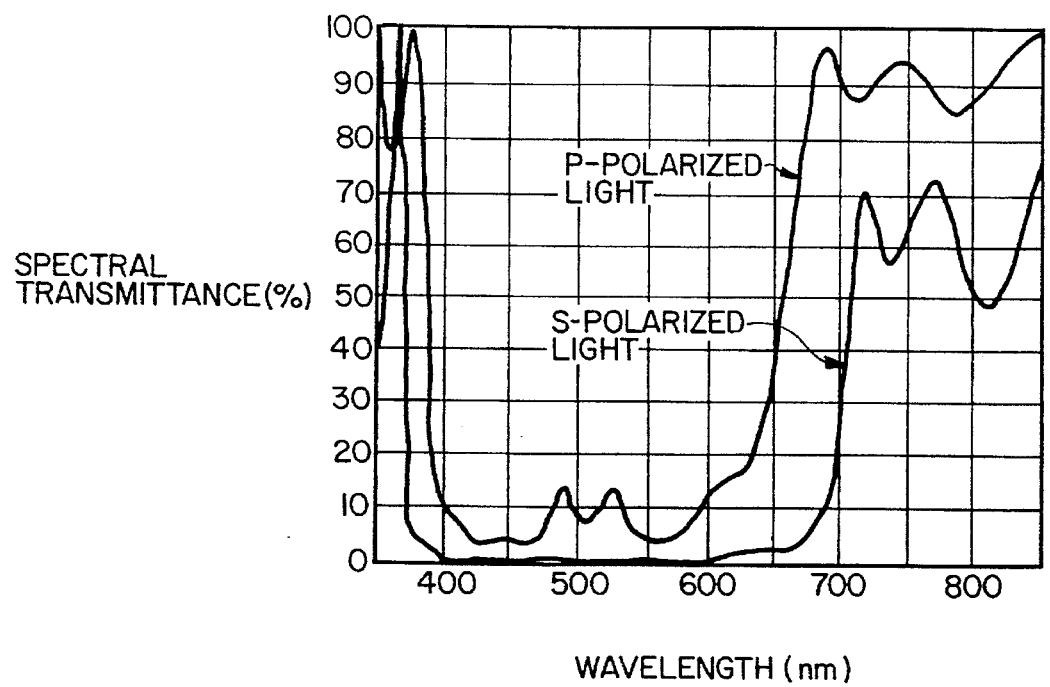
FIG. 3 A graph of spectral transmittance at an incidence angle of 50°.
Figure 4:
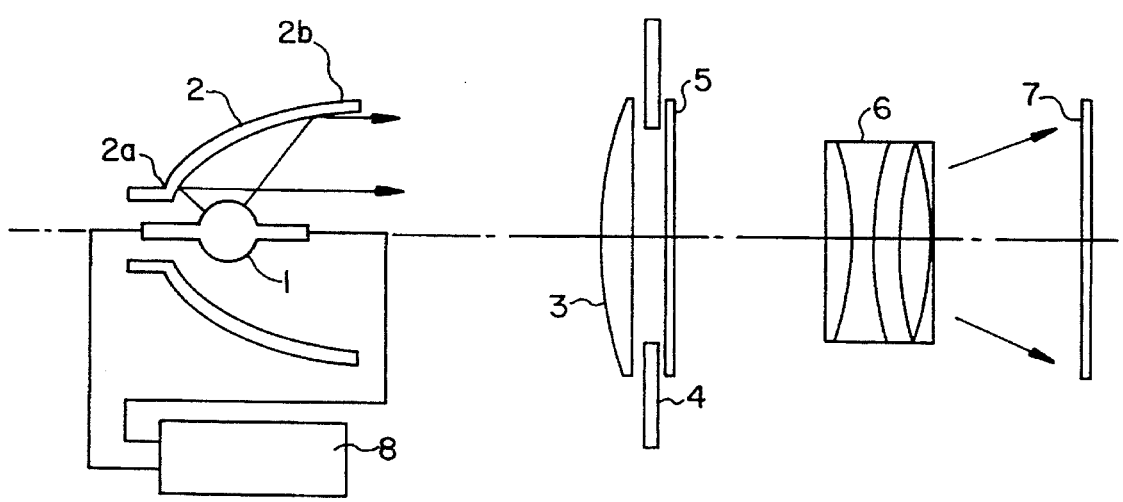
FIG. 4 A diagrammatic representation of an optical system.

FIG. 4 shows the optical system used. Reference numeral 1 designates a light source, which is a short arc-type metal halide lamp with a capacity of 250 W and a spacing between the electrodes of 5 mm. Encapsulated within a bulb are Dy-Nd-Cs iodide (dysprosium-neodymium-cesium iodide), mercury and argon gas.

The lamp is supplied by a current source 8. The light source lamp 1 can be constituted by a xenon lamp, a halogen lamp of the short arc-type or the like.

The light source 1 is located in a focus position of a reflector 2. From the light source 1, light with a small angle of incidence enters the centre 2a of the reflector 2 and its reflected light is converted into parallel light beams. Light with a large angle of incidence from the light source 1 enters a periphery 2b of the reflector 2 and its reflected light is converted into parallel light beams.

These parallel light beams pass through a condenser lens 3, a diaphragm or aperture frame 4 having a square aperture with a diagonal distance of approximately 80 mm and a liquid crystal display panel 5 which may take any sandwich type well known to those skilled in the art. They then enter a projection lens 6 and light from the projection lens 6 is projected onto a screen 7, which e.g. has a size of 810×610 mm.

The reflector 2 is made from light-transmitting, heat resistant glass, such as borosilicate glass or the like, and is a rotary paraboloid with a maximum external dimension of 120 mm $\phi$ with a F-number of 15.

A dielectric multifilm coating is deposited on one surface of the paraboloid. In the present embodiment the material having a low refractive index is silicon dioxide and the material with a high refractive index is titanium dioxide. Forty six (46) films are formed by electron beam-type vacuum deposition. More specifically, the multilayer coating has a double alternating structure, a bottom or "under" alternating structure of silicon dioxide layers of a thickness of approximately 80 nm alternating with titanium dioxide layers of a thickness of approximately 50 nm and a top alternating structure, deposited or formed on the top of the under alternating structure, of silicon dioxide layers of a thickness of approximately 110 nm alternating with titanium dioxide layers of a thickness of approximately 70 nm. Each of these layers may be varied in thickness as long as the multilayer coating reflects visible light within the wavelength band between the standard wavelengths of 430 and 830 nm.

Figure 7:
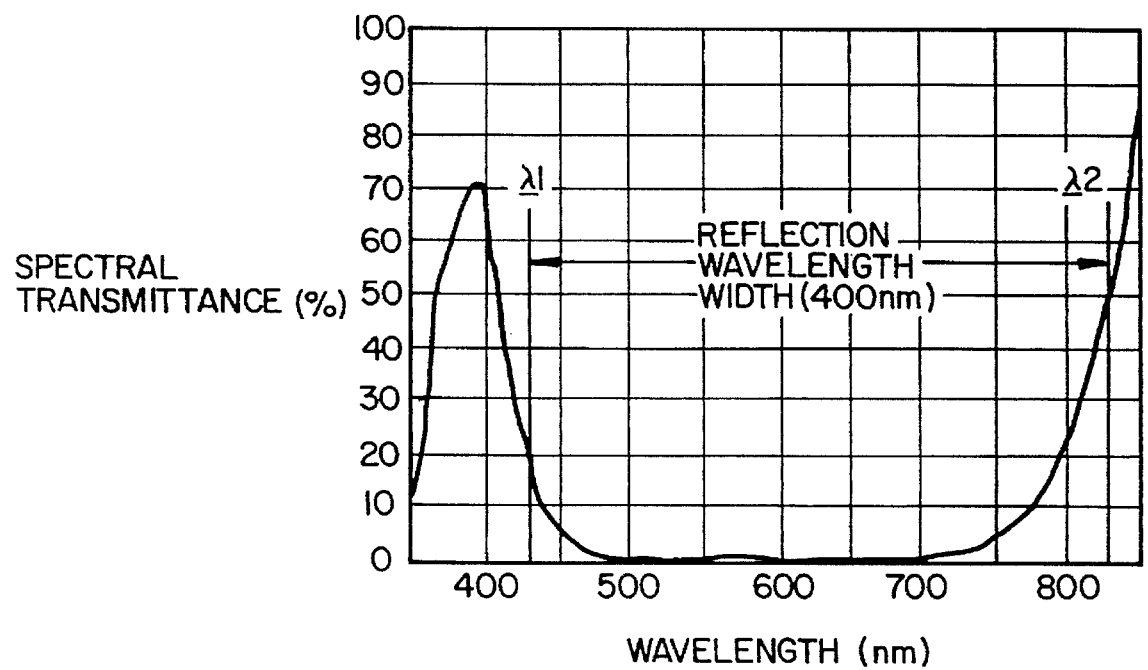
FIG. 7 A diagrammatic representation showing a spectral transmittance characteristic of a reflector according to the invention.

FIG. 7 illustrates a spectral transmittance characteristic by means of the reflector used in this embodiment. There is a wavelength $\lambda_1$, which has a spectral transmittance on a short wave side (with normal incidence) of 20% at 430 nm and a wavelength $\lambda_2$, which has a spectral transmittance on a long wave side (with normal incidence) of 50% at 830 nm and a reflection wavelength width at 400 nm.

As comparison example 1 a test was performed using a reflector with a wavelength $\lambda_1$, of 430 nm and a wavelength $\lambda_2$ of 750 nm. This reflector has a wavelength $\lambda_2$, which is outside the wavelength range determined according to the invention, the reflection wavelength width being 320 nm.

As comparison example 2 a test was carried out using a reflector with a wavelength $\lambda_1$ of 500 nm and a wavelength $\lambda_2$ of 830 nm. This reflector has a wavelength $\lambda_1$, which is outside a wavelength range determined according to the invention, the reflection wavelength width being 330 nm.

Using the aforementioned three reflectors colour shadings projected onto the screen were investigated.

Figure 5:
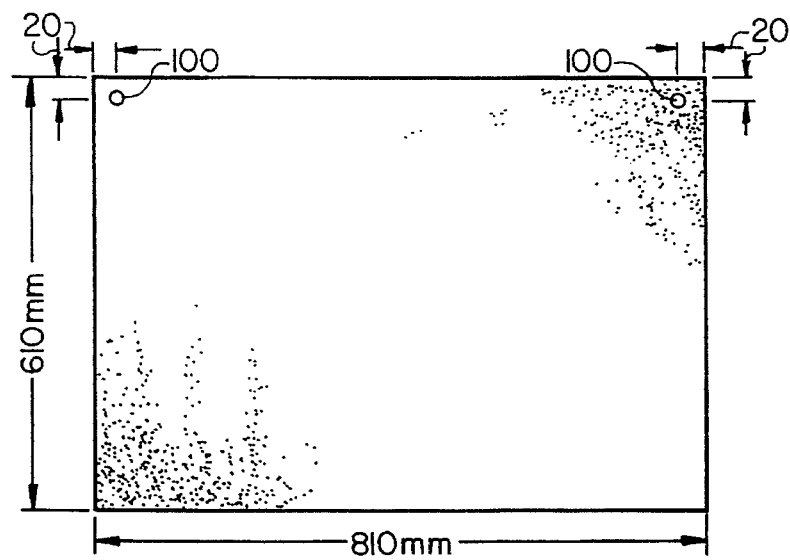
FIG. 5 A diagrammatic representation of the measuring points of a colour shading, as well as a XY-chromaticity on a screen.

The measuring points of the colour shading are two points, which are in each case 20 mm away from the two upper corners of the screen, as illustrated in FIG. 5. Moreover, for the quantitative representation of the colour shading, a XY-chromaticity of these two measuring points was measured.

Figure 6:
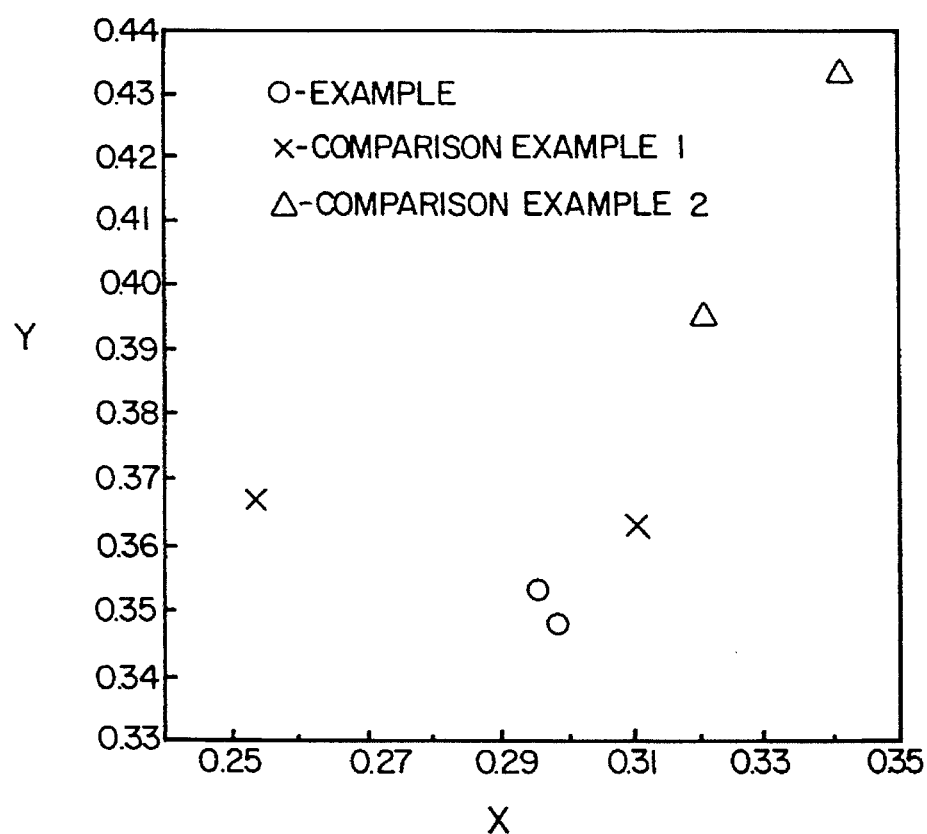
FIG. 6 A diagrammatic representation of the measurement result of a XY-chromaticity.

The result is given in FIG. 6. It can be seen that coordinates of the XY-chromaticity at the two measuring points measured using the reflector according to the invention significantly approach one another, whereas coordinates of the XY-chromaticity measured using the reflectors of the comparison examples are far removed from one another.

A quantitative colour shading value is represented on the basis of a spacing between the coordinates of the XY-chromaticity of the two measuring points $(X_1, Y_1)$ and $(X_2, Y_2)$. This means that the colour shading decreases, the shorter the distance (CD) to be calculated according to the following formula.

$$CD = \sqrt{((X_2 - X_1)^2 + (Y_2 - Y_1)^2)}$$

By means of table 1 the calculated CD values and the result of a visual check on the screen in the embodiment, comparison example 1 and comparison example 2 are shown. Table 1 gives the result of the visual check in such a way that the cases in which "no colour shading on the screen was detectable" are rated O and cases in which "a clear colour shading in four peripheral corners of the screen is detectable" are rated X.

TABLE 1

|  | $\lambda_1$ | $\lambda_2$ | $\lambda_2 - \lambda_1$ | CD | visual check |
| --- | --- | --- | --- | --- | --- |
| Embodiment | 430 | 830 | 400 | 0.006 | O |
| Comparison 1 | 430 | 750 | 320 | 0.057 | X |
| Comparison 2 | 500 | 830 | 330 | 0.042 | X |

This makes it quantitatively clear that the embodiment, in which the wavelength $\lambda_1$ is equal to or lower than 440 nm and the wavelength $\lambda_2$ at greater than or equal to 820 nm and the reflection wavelength width $(\lambda_2-\lambda_1)$ is large, has a small CD value and a small colour shading. The visual check confirms that there is no colour shading.

However, it is also confirmed that the comparison examples, in which the wavelength $\lambda_1$ or $\lambda_2$ are outside the wavelength range determined according to the invention and the reflection wavelength width is small, in each case have a large CD value and large colour shading and that a visual check also reveals a colour shading.

The reason why, according to the invention, the characteristic is determined on the basis of a transmittance with a normal incidence in the reflector is that a measurement of a transmittance quantity in the case of normal incidence can be carried out in a simpler and more accurate manner than with an oblique incidence. It is consequently not necessary for the transmittance standard to relate to a normal incidence.

EFFECT OF THE INVENTION

As explained hereinbefore, as a result of the measure according to the invention through which, in the case of a reflector, a wavelength $\lambda_1$, which has a spectral transmittance on a short wave side (for normal incidence) of 20%, is at equal to or smaller than 440 nm and a wavelength $\lambda_2$, which has a spectral transmittance on a wavelength side (for normal incidence) of 50% is at equal to or higher than 820 nm, a good projection image is obtained in the case of use for a light source material of a liquid crystal video projector, without there being a colour shading in the periphery of the screen.

It is to be understood that although a preferred embodiment of the invention has been described, various other embodiments and variations may occur to those skilled in the art. Any such other embodiments and variations which fall within the scope and spirit of the present invention are intended to be covered by the following claim.

What we claim is:

1. A reflector having a parabolic reflective surface of rotation, on which a dielectric multilayer coating is deposited so as to reflect only visible light emanating from a light source located at a focal point of said parabolic reflective surface of rotation, said dielectric multilayer coating comprising an alternating structure of silicon dioxide layers and titanium dioxide layers so as to have a spectral transmittance of 20% for said visible light having a wavelength equal to or shorter than approximately 430 nm on a short wavelength side and a spectral transmittance of 50% for said visible light having a wavelength equal to or longer than approximately 830 nm on a longer wavelength side, said alternating structure further comprising an under alternating structure of silicon dioxide layers each of which has a thickness of approximately 80 nm alternating with titanium dioxide layers each of which has a thickness of approximately 50 nm and a top alternating structure, deposited on the top of said under alternating structure, of silicon dioxide layers each of which has a thickness of approximately 110 nm alternating with titanium dioxide layers of a thickness of approximately 70 nm.

2. A reflector as defined in claim 1, wherein said alternating structure comprises 46 alternating layers of silicon dioxide layers and titanium dioxide layers.

3. An optical device comprising:

a light source for generating visible light;

a reflector having a parabolic reflective surface of rotation on which is deposited a dielectric multilayer coating for reflecting visible light generated from said light source located at a focal point of said parabolic reflective surface of rotation; and a liquid crystal display panel to which said visible light reflected by said reflector is converted and directed in parallel beams;

said dielectric multilayer coating comprising an alternating structure of silicon dioxide layers and titanium dioxide layers so as to have a spectral transmittance of 20% for said visible light having a wavelength equal to or shorter than approximately 430 nm on a short wavelength side and a spectral transmittance of 50% for said visible light having a wavelength equal to or longer than approximately 830 nm on a longer wavelength side;

said alternating structure comprising an under alternating structure of silicon dioxide layers each of which has a thickness of approximately 80 nm alternating with titanium dioxide layers each of which has a thickness of approximately 50 nm and a top alternating structure, deposited on the top of said under alternating structure, of silicon dioxide layers each of which has a thickness of approximately 110 nm alternating with titanium dioxide layers of a thickness of approximately 70 nm.

4. A reflector as defined in claim 3, wherein said alternating structure comprises 46 alternating layers of silicon dioxide layers and titanium dioxide layers.

* * * * *